July 16, 1940.  J. J. GROBE  2,208,258
ALIGNING DEVICE FOR X-RAY EQUIPMENT
Filed Dec. 1, 1938  4 Sheets-Sheet 1

INVENTOR.
Julius J. Grobe
BY Cox & Moore
ATTORNEYS.

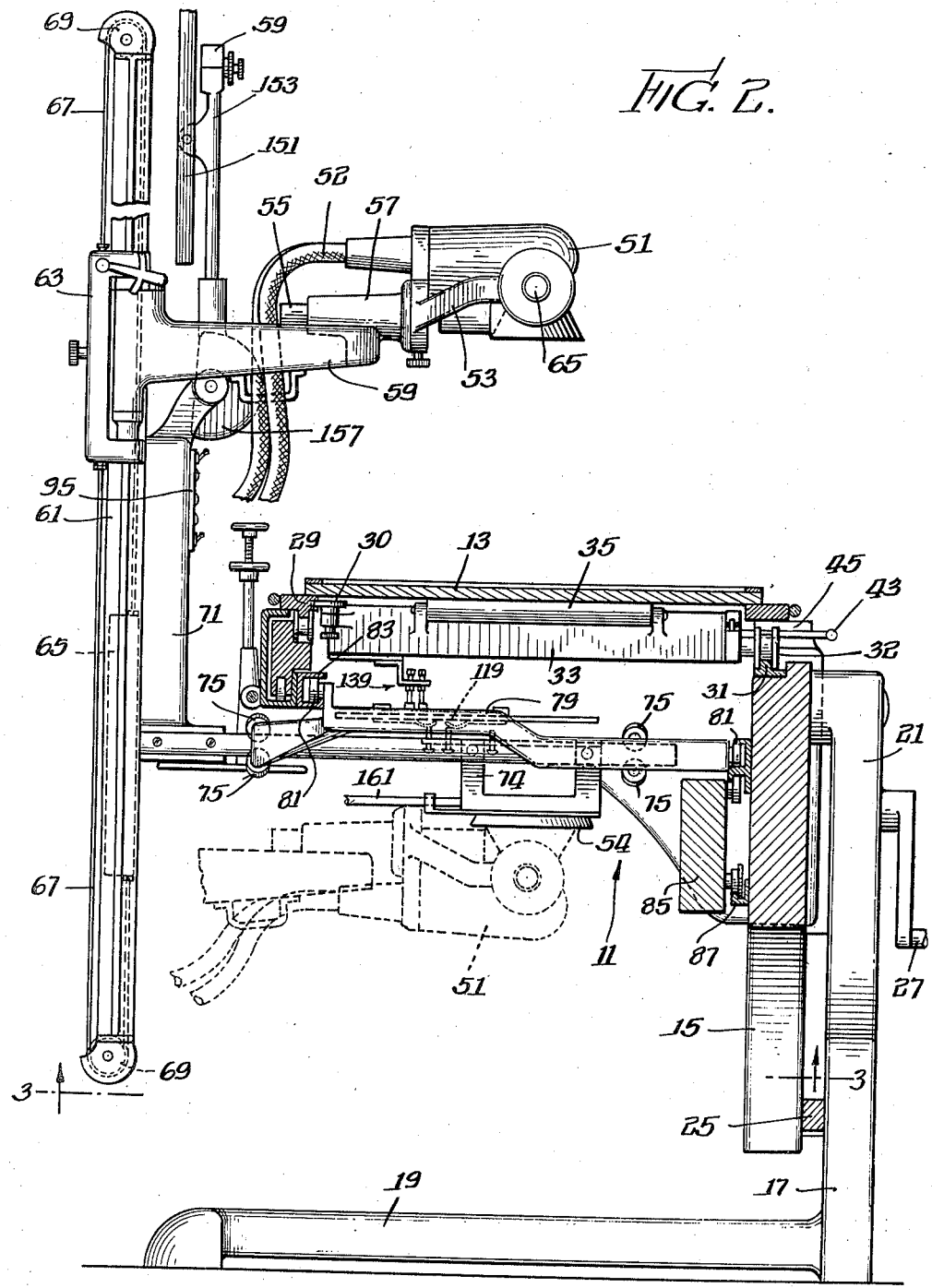

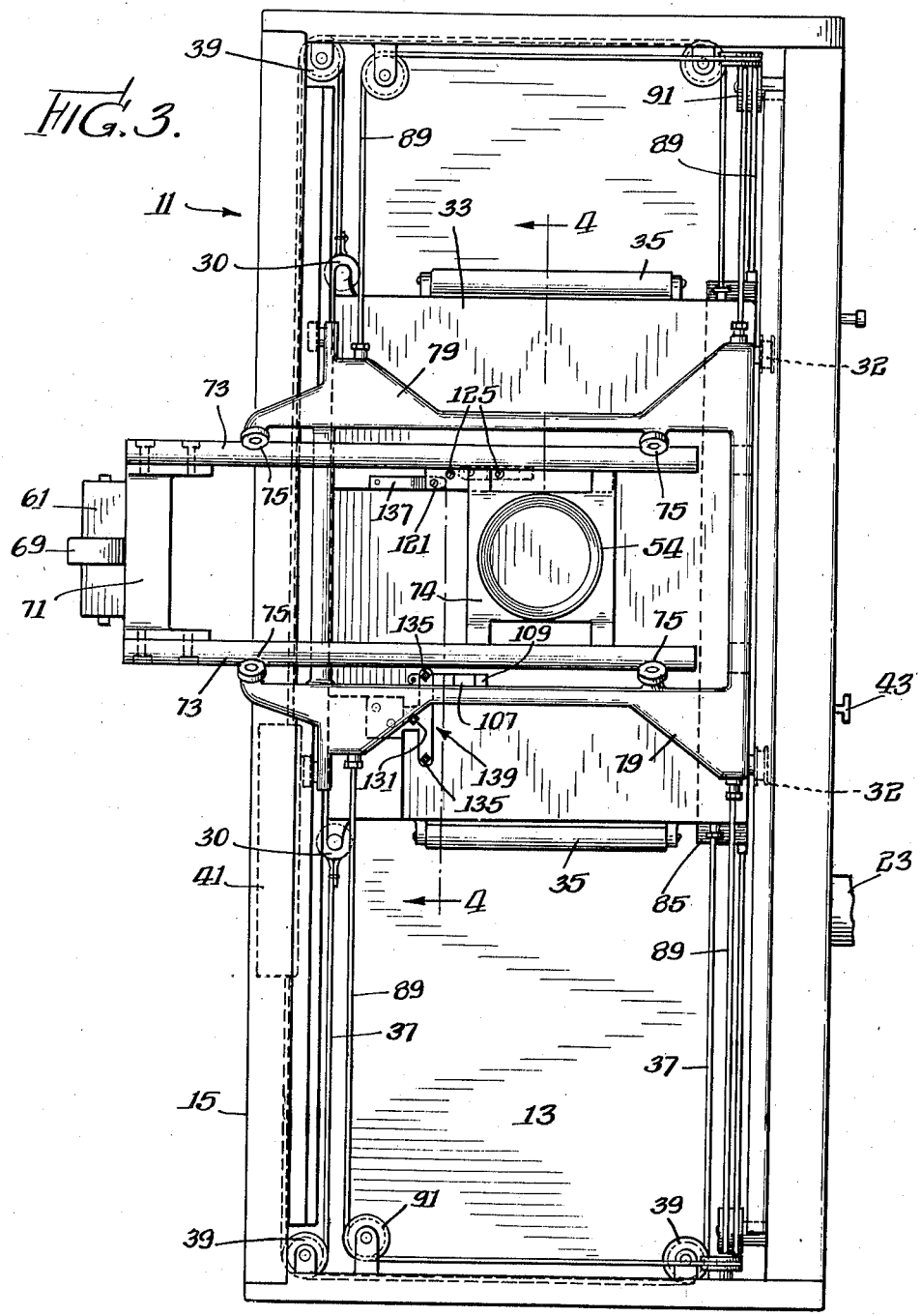

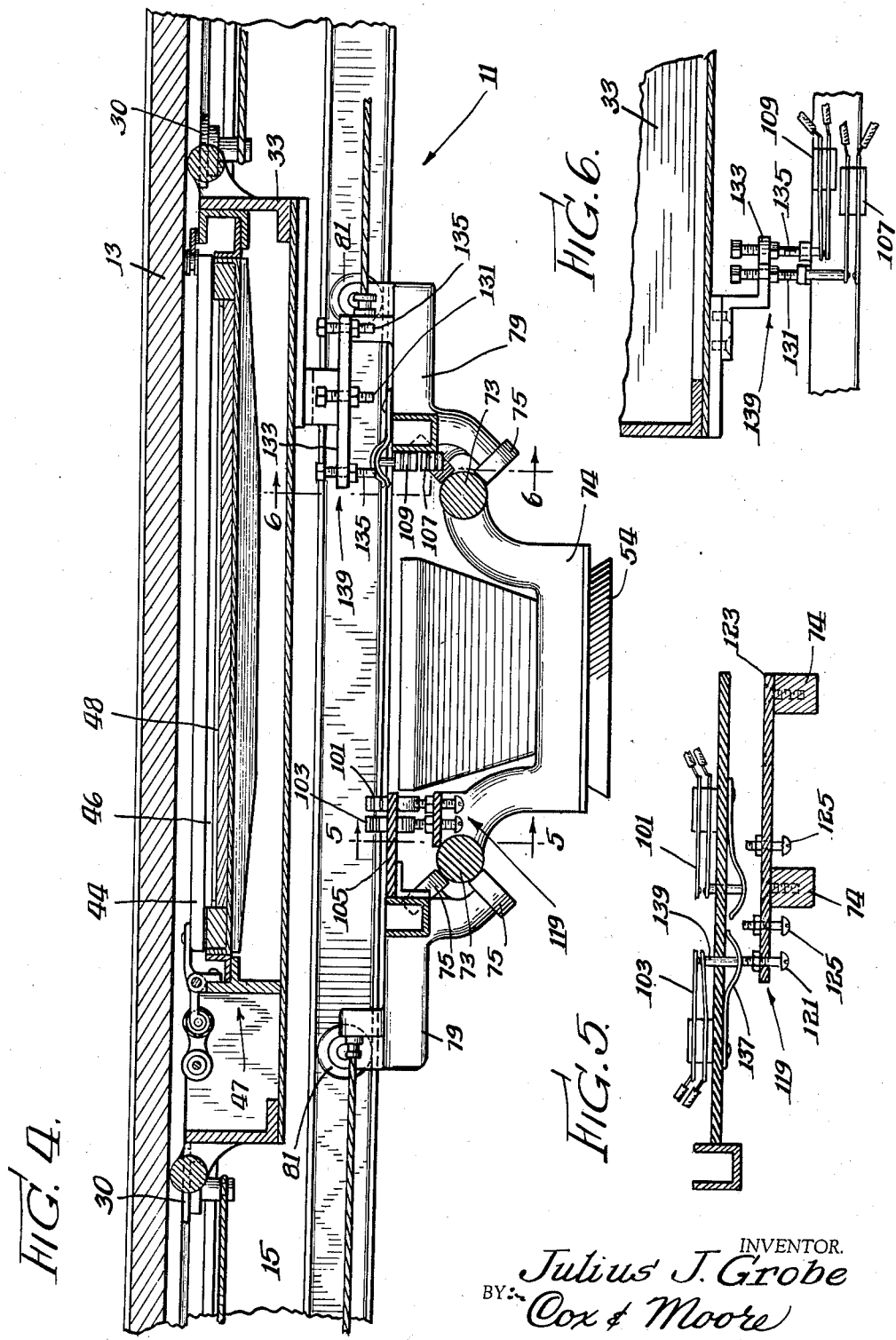

Patented July 16, 1940

2,208,258

UNITED STATES PATENT OFFICE 2,208,258

ALIGNING DEVICE FOR X-RAY EQUIPMENT

Julius J. Grobe, Oak Park, Ill., assignor to General Electric X-Ray Corporation, Chicago, Ill., a corporation of New York Application December 1, 1938, Serial No. 243,305

15 Claims. (Cl. 250—57)

My invention relates in general to adjustment indication and has more particular reference to means for indicating the relative position of mutually adjustable parts, the invention especially pertaining to improved means for indicating the position of sensitive film and a source of X-ray, both relatively movable on and with respect to a support for an object to be pictured by radiography.

An important object of the invention is to provide for the accurate indication of the relative position of cooperating, relatively movable elements; a further and more particular object being to provide means for indicating the relative adjustment between cooperating elements which are independently movable in a plurality of directions.

Another important object is to provide instantaneously acting, visual indicating means for showing mutually adjusted positions of independently movable elements such as the film carrier and ray source in radiographic apparatus.

Another important object is to provide, in radiographic apparatus, including a support for maintaining a body in position to be pictured by radiography, a film carrier adjustable with respect to the support and the body thereon to position the film in a desired location with respect to the supported body, and a ray source adjustable in a plurality of directions with respect to the body, the combination of means operable to indicate the relative position of the ray source with respect to the film carrier, whereby the film and ray source may be brought readily into a desired alignment in conditioning the apparatus for the making of a radiograph; a further important object being to utilize tell-tale lamps suitably positioned in the radiographic equipment and interconnected with cooperating switch means on the relatively movable film and ray source carriers in order to indicate the relative alignment of the ray source with the film.

Another important object is to provide means for visually indicating the central alignment of a ray source with a film to be exposed thereto for radiographic purposes; a further object being to provide means for indicating a predetermined eccentricity of the ray source from centered position in any one of a plurality of directions, whereby to facilitate the conditioning of the apparatus for the making of stereoscopic pictures, that is to say, a series of pictures of the same subject made each from a different viewpoint.

The foregoing and numerous other important objects, advantages and inherent functions of the invention will become apparent as the same is more fully understood from the following description, which, taken in connection with the accompanying drawings, discloses a preferred embodiment.

Referring to the drawings:

Figure 2 is a vertical section taken substantially along the line 2—2 in Figure 1;

Figure 3 is a horizontal view taken substantially along the line 3—3 in Figure 2;

Figure 4 is a vertical section taken substantially along the line 4—4 in Figure 3;

Figures 1, 7:
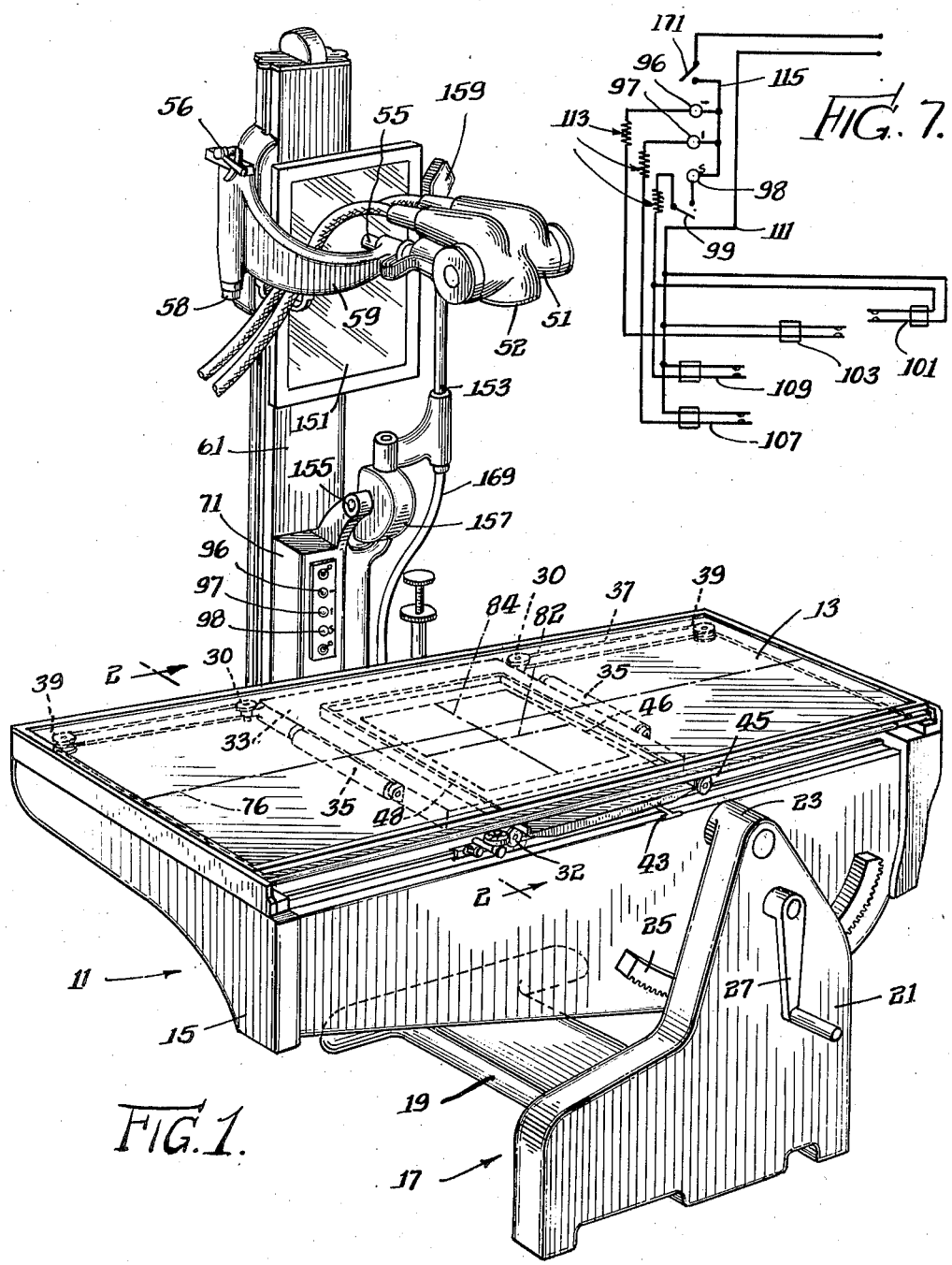
Figure 1 is a perspective view of radiographic apparatus provided with adjustment indicating means embodying my present invention.

Figures 5 and 6 are vertical sections taken substantially along the lines 5—5 and 6—6, respectively, in Figure 4; and Figure 7 is a diagram of electrical connections comprising the indicator of my present invention.

To illustrate the invention, I have shown on the drawings a compact apparatus adapted for fluoroscopic examination and for radiographic purposes and, while the illustrated apparatus has many novel and convenient features, my present invention is not necessarily restricted to the particular form or arrangement of parts comprising the radiographic apparatus which I have shown merely for the purpose of illustrating the operation of the new adjustment indicating system which forms the substance of my present invention, and which may, of course, be utilized in any equipment in which it may be desirable to indicate the relative position of relatively and mutually adjustable parts.

The radiographic apparatus in which, merely for expository purposes, I have shown an adjustment indicator embodying my present invention, comprises support means 11 in the form of a table-like element 13 on or against which a body may be carried in position to be pictured radiographically. The table-like element 13 comprises a panel suitably supported in a frame 15 which in turn is mounted upon a suitable base 17. In the illustrated embodiment this base comprises a foot portion 19 and an upstanding pedestal portion 21, affording a bearing 23 in which the frame 15 and table top 13 are tiltably mounted. Cooperating means on the frame 15 and the pedestal 21 and comprising a rack 25 on the frame 15 and suitable gears on the pedestal and drivingly connected with a hand crank 27, are provided for turning the support 11 on the pedestal 21 to any desired inclination.

The frame 15 is provided with tracks 29 and 31 along the opposite sides of and under the table top 13 for guiding and supporting a carriage 33 for longitudinal movement immediately beneath the table top. The carriage 33 is preferably provided with wheels or rollers 30 and 32, respectively, having engagement with the tracks 29 and 31. The carriage has rollers 35 at the opposite ends of the carriage in position to bear upon the under side of the table top 13.

Suitable cords 37 traveling on sheaves 39 at opposite ends of the frame 15, and connected to the opposite ends of the carriage 33 and with counterweight means 41, are provided to counterbalance the mass of the carriage and facilitate movement thereof along the tracks 29 and 31, regardless of the tilted position of the support 11 on the pedestal 21. A handle 43 on the carriage 33 and projecting through an elongated opening 45 at one side of the frame 15 preferably adjacent the pedestal 21, is provided for shifting the carriage 33.

The carriage 33 comprises a frame providing a housing having support means 47 therein for receiving a case or cassette 46 containing a sheet or film 48 of material sensitive to X-ray, and the carriage 33 may and preferably does embody a Bucky diaphragm 44 mounted therein in position extending between the cassette chamber and the table top.

It will be seen from the foregoing that the carriage 33 is freely movable between the opposite ends of the support 11 beneath the table top 13, whereby the film in a cassette mounted in the carriage may be positioned in any desired locality within the longitudinal extent of the support so that the film may be located opposite any portion of a body on the table top that it may be desired to picture radiographically.

The radiographic equipment also comprises a source of X-ray comprising in the illustrated embodiment an X-ray tube contained in a housing 51 formed with a window defined by a rim 52. Means is provided for supporting the casing containing the X-ray tube above the table top in position to direct X-ray through the window downwardly upon a body supported on the table. The tube in the casing 51 may be energized through cables 52 extending from a suitable power source and entering the casing 51 through suitable bushings and connecting with the tube within the casing, whereby the entire assembly is rendered substantially shock-proof.

The tube casing 51 is tiltably mounted in a yoke 53 having a stem 55 extending in and supported by a sleeve bearing 57 which in turn is carried by an arm 59 extending from an upright 61, the arm preferably being pivoted as at 58 in a frame 63 which is slidable longitudinally upon the support 61.

The illustrated tube casing support structure permits the casing to be adjustably tilted about an axis 65 in the yoke 53 and to be locked in adjusted position, and also permits the yoke 53 to be tilted about the axis of the stem 55 substantially at right-angles with respect to the axis 65. The yoke 53 may also be locked in adjusted position by means of suitable clamps. The frame 63 likewise may be clamped in adjusted position on the member 61, and latch means 56 is preferably provided to secure the arm in position on the frame 63 to support the casing 51 firmly. In making radiographic pictures of a subject on the table 13, the tube and its casing will be secured in a position directing the X-ray vertically toward the table top 13.

The support 61 preferably extends in a direction at right angles with respect to the plane of the table top, and the bracket or carriage 63 affords a means for adjusting the vertical distance between the ray source and the table top.

The support 61 preferably comprises a reinforced tubular member of sheet metal forming tracks 65 on its opposite sides for slidingly carrying the frame 63 for longitudinal movement on the support. A counterweight also may be arranged within the tubular support 61 and provided for sliding movement along internally disposed tracks. This counterweight is preferably interconnected with the frame 63 by means of cords 67 traveling on sheaves 69 at the opposite ends of the tubular member 61, in order to support the frame 63 and the tube and its casing 51 at any adjusted position on the support 61, and to facilitate the movement of the tube carrying assembly on the support 61.

The support 61 and the tube carrying assembly thereon is mounted for longitudinal as well as lateral movement with respect to the table top 13, and to this end the member 61 is supported on a mounting frame 79 which is mounted on the frame 15 for movement in a longitudinal direction with respect to the table top 13, that is to say, in a direction paralleling the longitudinal axis 76 of the table top. To this end, the frame 79 is provided with rollers 81 which extend in suitable tracks 83 formed longitudinally in the opposite sides of the frame 15.

A suitable counterweight 85, longitudinally movable in tracks 87 on the frame 15, is provided for balancing the weight of the frame 79 and the tube carrying elements supported thereby, the counterweight 85 being interconnected with the opposite sides of the frame 79 by means of cords 89 traveling on sheaves 91 at the opposite ends of the frame 15 whereby to facilitate adjustment of the frame 79 in a direction longitudinally of the table top 13, particularly when the same is in position tilted from the normal horizontal position.

To provide for lateral movement of the ray source with respect to the table top, the member 61 is secured on a bracket 71 forming a part of a support frame 74 comprising preferably a pair of spaced rails 73 extending from the bracket 71 under the frame 15 and slidingly received in rollers 75 on the mounting frame 79, whereby the bracket 71 and the member 61 are supported for movement with respect to the frame 15 in a direction normal to the longitudinal axis of the table top.

It will be seen that the member 61 extends below the table top 13 and below the frame 74 and bracket 71. This arrangement permits the tube casing 51 to be positioned beneath the support 11 by unlatching the fastener 56, swinging the arm sufficiently toward the left in Figure 1 to clear the frame 15, then forcing the frame 63 along the upright to bring the arm below the frame 74, turning the ray source housing and yoke and swinging the arm 59 to bring the ray source housing beneath the frame 74.

The frame 74 is provided with an annular seat 54 to receive the rim 52 of the housing 51 which defines the X-ray opening. By raising the arm 59 on the member 61 after the casing 51 has been positioned opposite the seat 54, the rim 52 may be snugly engaged in the seat to hold the casing and tube in position, as shown in dotted lines in Figure 2, to project X-ray through the table top and through a body supported thereby for fluoroscopic examination.

A suitable screen 151 is provided for fluoroscopic examination. This screen is mounted on an arm 153 pivoted at 155 on the bracket 71. Spring and latch means are provided in the housing 157 to normally hold the screen in the inoperative position shown in Figure 1. The screen, however, may be swung down over the table top when needed for fluoroscopic work. The frame 74 adjacent the seat may be formed with a shutter actuated by control cable 161 operated by suitable actuating means 159 conveniently located on the arm 153 adjacent the screen 151.

The arm 59 also may be swung through one hundred and eighty degrees from the position shown in Figure 1 to permit the use of the ray source in casing 51 for radiographic and fluoroscopic purposes independently of the table 13.

It will be seen from the foregoing that the apparatus may be readily adjusted to position the ray source in the casing 51 at any desired elevation above the table top and that the light source also may be placed vertically above any selected point within the area of the table top. Adjustment of the ray source in a direction vertically of the table top is accomplished by movement of the frame 63 along the support 61. The ray source also may be moved to any desired position longitudinally of the table top by adjusting the frame 79 along the tracks 83. The ray source furthermore may be adjusted laterally of the table top by moving the bracket 71 and the parts supported thereby on the frame 79, the rails 73 sliding freely in the rollers 75.

The foregoing apparatus may be used in making radiographic pictures by first placing the subject to be pictured upon the table top 13; then positioning the cassette carrying frame 33 immediately beneath the portion of the subject to be pictured. The ray source should then be arranged vertically above the center of the sensitive film 48, in the cassette 46, and after being so adjusted, the ray source may be energized appropriately to make the desired exposure.

Difficulty may be encountered in aligning the ray source accurately with respect to the film in the carriage 33 since the carriage is substantially concealed beneath the table top, and to this end I have provided indexing means to indicate visually the alignment of the ray source with respect to the film. To this end, I provide on the bracket 71 a panel 95 in position readily visible to an operator standing on the side of the support 11 opposite from the support member 61. This panel 95 carries tell-tale means adapted to visually indicate the relative position of the ray source with respect to a film in the carriage 33. I prefer to utilize small flashing lamps as the tell-tale means and, while any number of lamps may be utilized, I have, for the purpose of demonstrating the present invention, illustrated three lamps 96, 97 and 98.

These lamps are connected by suitable conductors with switches mounted on the frame 79 in position cooperating with switch actuating means on the cassette carriage 33 and on the frame 74. The arrangement is such that when the ray source in the casing 51 is disposed opposite the longitudinal center line 76 of the table top, which coincides with the longitudinal center line 82 of the film in the carriage 33, the lamp 96 will be energized to emit a visual signal indicating the longitudinally centered relationship of the ray source with respect to the film. The system also provides for energizing the lamp 97 when the ray source in the casing 51 is opposite the lateral center line 84 of the film in the carriage 33, so that both of the lamps 96 and 97 will be energized only when the ray source is aligned vertically with the center of the film at the point of intersection of the lateral and longitudinal center lines thereof. It will be seen that the foregoing arrangement provides an extremely simple, readily perceivable indication of tube alignment and that centering of the ray source may be accomplished simply by moving the source in a direction to cause one of the lamps 96 and 97 to light up, and then by moving the ray source in a normal direction until the other lamp also becomes lighted, whereupon the radiographic exposure may be made instantly with the knowledge that the X-ray source is in proper centered alignment for the exposure.

Modern radiographic technique frequently requires the making of so-called stereoptic pictures, that is to say, for complete diagnostic purposes, it is often desirable to make a series of pictures including, in addition to a picture made with the X-ray source centered with respect to the film, several additional views made by shifting either the ray source or the film carrier out of the relatively centered relationship by a predetermined displacement, usually of the order of two inches; and it is ordinarily sufficient for stereoptic purposes to make a series of five pictures including a centered picture and four additional pictures made by relatively displacing the ray source on opposite sides of the centered position along both the longitudinal and lateral center lines of the film. To this end, the index system of my present invention utilizes the lamp 98 to indicate the necessary displacement for stereoscopic purposes.

The indexing system is shown on the drawings more particularly in Figures 4, 5, 6 and 7; and, as shown, it comprises, in addition to the lamps 96, 97 and 98, a pair of switches 101 and 103 on a suitable support 105 mounted on the frame 79, and a pair of switches 107 and 109 also suitably mounted on the frame 79. The switches are all preferably connected, on one side thereof, with a common return conductor 111 connecting with one side of a suitable source of lamp energizing power. The switches 101 and 109 also are both interconnected in parallel relationship in a circuit including the lamp 98 and a control switch 99. The switch 103 is connected in series with the lamp 96 while the switch 107 is connected with the lamp 97, suitable resistors 113 being included in each lamp circuit preferably between the lamps and the switches with which they are connected. The lamps 96 and 97 and the switch 99 also are connected with the power source through a conductor 115, including a control switch 117, so that the entire system may be rendered inoperative by opening the switch 117, the switch 99 serving to disable the stereoscopic indicating lamp 98 only.

Switch actuating means 119 is provided on the frame 74, said means comprising an adjustable projection 121 on a plate 123 which is secured on portions of the frame 74 in position such that when the frame 74 moves laterally in the frame 79, the member 121 will cause the switch 103 to close only when the frames 74 and 79 are in a position such that the ray source in the casing 51 is in vertical alignment with the longitudinal center line of the table top, i. e., the longitudinal center line of a film in position for exposure in the cassette carriage 33. The plate 123 also carries a pair of adjustable switch actuating members 125 in offset relationship with respect to the member 121 and spaced in position to close the switch 101 whenever the ray source in the casing 51 is offset a predetermined stereoptic distance on either side of the longitudinal center line of the table top, that is to say, on either side of the longitudinal center line 82 of the film 48.

Switch actuating means 129 also is provided on the cassette carriage 33, said means comprising an adjustable projection 131 on a plate 133 which is secured on the frame of the carriage 33 in position such that when the carriage 33 moves longitudinally with respect to the frame 79, the member 131 will cause the switch 107 to close only when the frames 33 and 79 are in a position such that the ray source in the casing 51 is in vertical alignment with the lateral center line of a film positioned in the cassette carriage 33. The plate 133 also carries a pair of adjustable switch actuating members 135 in offset relationship with respect to the member 131 and positioned to close the switch 109 whenever the ray source in the casing 51 is offset a predetermined distance on either side of the lateral center line 84 of the film in the cassette carriage.

The switches 101, 103, 107 and 109 may be of any convenient form, although I prefer to use contact switches each comprising a shiftable blade normally biased toward switch open position and adapted to be depressed in order to close the switch. The frame 79 also carries a resilient cam-like switch actuator 137 for each switch in position to be engaged by the corresponding actuating members 121, 125, 131 and 135, said members 137 each having switch closing rods 139, preferably of insulating material, interconnecting the cam members 137 with the movable arms of the switches.

The actuating members conveniently comprise studs threaded through the plates 123 and 133 so that the projecting ends of the studs may extend in position to engage and ride upon the cam members 137 in closing the switches. The studs may be provided with lock-nuts to hold the same in adjusted position, and the plates 123 and 133 may, if desired, be formed with a plurality of threaded openings at spaced intervals to permit the studs 125 and 135 to be changed, in order to adjust the stereoptic displacement.

The conductor 111 and the conductors connecting the switches with the resistors 113 and the lamps 96, 97 and 98 may extend from the panel 95 through concealed channels in the bracket 71, and thence between the rails 73 to the switches on the frame 74, the conductors having sufficient flexibility to accommodate the relative sliding movement between the frames 74 and 69.

For convenience in observation, I prefer to mount the lamps 96, 97 and 98 in individual sockets with covers forming lenses of contrasting colors, so that the centering lamps 96 and 97 may be readily distinguished from the stereoptic indicator lamp, and to this end I prefer to employ green and red colors, respectively, to identify the centering and the stereoptic indication lamps.

It will be seen from the foregoing that the indexing system is positive in action to afford a convenient visual alignment indication, whereby the film in the cassette carriage 33 and the ray source in the housing 51 may be aligned quickly, easily and accurately in centered position and also offset to position the parts for stereoptic radiography. While I have illustrated the indexing system as applied in a preferred apparatus, which has several novel and advantageous features, it will be obvious that the invention is not necessarily restricted to the particular form or construction of the apparatus in which it is used, but that the system may be incorporated wherever it is desired to afford a handy and simple means for indicating the alignment of parts relatively movable in a plurality of directions; and although many features of the radiographic equipment which I have herein illustrated and described in connection with my improved indexing system, are per se novel and patentable, I do not herein claim the novel features of the radiographic equipment since the same forms the subject matter of invention more particularly illustrated, described and claimed in co-pending applications.

It is thought that the invention and its numerous attendant advantages will be understood from the foregoing description and it is obvious that numerous changes may be made in the form, construction and arrangement of the various parts without departing from the spirit and scope of the invention nor sacrificing its attendant advantages, the form herein shown and described being merely for the purpose of demonstrating the invention.

The invention is hereby claimed as follows:

1. Indexing means for radiographic equipment comprising the combination, with a support frame and a plurality of frames independently movable with respect to the support frame, and comprising one a film carriage frame and another a mounting frame for a source of X-rays, of normally inoperative visual indicator means, and cooperating means, on a pair of said frames, operable, when said frame carriage and mounting frame reach a predetermined related position, to energize said indicator means.

2. Indexing means for radiographic equipment comprising the combination, with a support frame and a plurality of frames, movable with respect to the support frame and comprising the one a film carriage frame and another a mounting frame for a source of X-rays, said carriage and mounting frames being both movable with respect to the support frame in different angular directions as well as in the same direction, of a pair of normally inoperative visual indicators and cooperating means on a plurality of said frames and operable, when said frame carriage and mounting frame reach a predetermined relative position in the direction of movement of the carriage, to energize one of said indicators to show said pdedetermined relative position, and to energize the other of said indicators, when said frame carriage and mounting frame are in a predetermined shifted position, in the direction of movement of the mounting frame, to show such predetermined related position.

3. Indexing means for radiographic equipment comprising the combination, with a support frame forming an elongated table and a plurality of relatively movable frames, including a film carriage frame movable longitudinally with respect to the support frame, and mounting means for a source of X-rays comprising a frame movable with respect to the support frame laterally as well as longitudinally of said support frame, of normally inoperative, visual indicating means and cooperating means, on said relatively movable frames, operable to energize said indicating means whenever said carriage frame and said support means reach a predetermined relative position.

4. Indexing means for radiographic equipment comprising the combination, with a support frame and a plurality of relatively movable frames, including a film carriage frame movable with respect to the support frame and mounting means comprising a mounting frame, movable with respect to the support frame in the direction of movement of the film carriage frame, and support means for a ray source movable on the mounting frame in an angular direction with respect to the direction of movement of the film carriage frame, of a pair of normally inoperative indicators, and cooperating means on a plurality of said frames and operable, when said film carriage frame and said mounting frame reach a predetermined relative position in the direction of movement of the film carriage frame, to energize one of said indicators to show said predetermined relative position, and to energize the other of said indicators, when said support means and said film carriage frame reach a predetermined related position in the direction of movement of the support means, to show such predetermined related position.

5. Indexing means for radiographic apparatus comprising the combination, with a support frame forming an elongated table and a plurality of relatively movable frames, including a film carriage movable longitudinally with respect to the support frame and a mounting frame for carrying a source of X-rays and movable laterally as well as longitudinally with respect to the direction of movement of the film carriage, of normally inoperative visual indicator lamps, cooperating switch means on said frames, and circuit means controlled by said switch means to energize said indicator lamps when said mounting frame and film carriage are in such position with respect to the support frame that said source has a predetermined alignment with a film in said carriage.

6. Indexing means for radiographic apparatus comprising the combination, with a support frame forming an elongated table and a plurality of relatively movable frames, including a film carriage movable longitudinally with respect to the support frame and a mounting frame for carrying a source of X-rays and movable laterally as well as longitudinally with respect to the direction of movement of the film carriage, of a pair of normally inoperative visual indicators and cooperating switch means on said relatively movable frames and operable, when said film carriage and said mounting frame reach predetermined relative alignment in the direction of movement of the carriage such that the light source is in a predetermined lateral alignment with the film in said carriage, to energize one of said indicators to show said condition of longitudinal alignment, and to energize the other of said indicators, when said mounting frame and film carriage are in such a predetermined related position that the light source is in a predetermined lateral alignment with said film, to indicate such predetermined longitudinal alignment.

7. Indexing means for radiographic equipment comprising the combination, with a support frame and a plurality of relatively movable frames, including a film carriage frame movable with respect to the support frame and a mounting frame for a source of X-rays movable with respect to the support frame independently of the movement of the carriage frame, of a lamp, and cooperating switch means on a plurality of said frames and electrically interconnected with said lamp, said switch means being operable to energize said lamp to afford a visual indication when said carriage frame and mounting frame reach a predetermined related position.

8. Indexing means for radiographic equipment comprising the combination, with an elongated support frame and a plurality of relatively movable frames, including a film carriage frame movable longitudinally with respect to the support frame, a mounting frame for a source of X-rays movable longitudinally with respect to the support frame and support means movable on the mounting frame laterally with respect to the direction of movement of said mounting frame and said carriage frame, of visual indicating means and cooperating switch means on said frames, said switch means being electrically connected with said visual indicating means and operable to actuate the same when said carriage frame and said support frame reach any one of a number of different relative positions.

9. Indexing means for radiographic equipment comprising the combination, with an elongated support frame and a film plurality of relatively movable frames, including a carriage frame movable longitudinally with respect to the support frame, a mounting frame for a source of X-rays movable longitudinally with respect to the support frame and support means movable on the mounting frame laterally with respect to the direction of movement of said mounting frame and said carriage frame, of visual indicating means and a plurality of switches on said frames and electrically interconnected with said visual indicating means, means on said frames to actuate certain of said switches only when said frame carriage is in predetermined aligned position with respect to said mounting frame means to actuate others of said switches only when said support frame is in predetermined relative positions with respect to said mounting frame whereby to energize said visual indicating means.

10. Indexing means for radiographic equipment comprising the combination, with an elongated support frame and a plurality of relatively movable frames, including a film carriage frame movable longitudinally with respect to the support frame and a mounting frame for a source of X-rays movable laterally with respect to the support frame, of visual, electrically actuated indicator means, cooperating switch means controllingly connected with said visual indicator means for actuating the same, and means for actuating said switch means when said film carriage frame and mounting means occupy a predetermined relative position.

11. Indexing means for radiographic equipment comprising the combination, with an elongated support frame and a plurality of relatively movable frames, including a film carriage frame movable longitudinally with respect to the support frame and a mounting frame for a source of X-rays movable longitudinally and laterally with respect to the support frame independently of the movement of said film carriage frame, of a plurality of visual, normally inoperative, electrically actuated indicators, and cooperating means on said frames and operable to actuate one of said indicators when said film carriage frame and mounting frame are in a predetermined, relatively aligned position, and to actuate another of said indicators when said film carriage frame and mounting means are relatively displaced a predetermined distance from said aligned position in any one of a plurality of directions radially of such aligned position.

12. Indexing means for radiographic equipment comprising the combination with an elongated support frame forming a table, a film carriage frame longitudinally movable with respect to said support frame beneath and substantially throughout the length of said table, a support frame for a ray source and means to mount said support means for longitudinal as well as lateral movement with respect to said table to position said ray source vertically above substantially any selected portion within the area of said table, of a normally inoperative, electrically actuated indicator, and actuating means on a plurality of said frames and operable to actuate said indicator when the support frame and carriage frame are in predetermined relative position in which the ray source is in vertical alignment with a predetermined point in the film carriage frame.

13. Indexing means for radiographic equipment comprising the combination with an elongated support frame forming a table, a film carriage frame longitudinally movable with respect to said support frame beneath and substantially throughout the length of said table, a support frame for a ray source and means to mount said support means for longitudinal as well as lateral movement with respect to said table to position said ray source vertically above substantially any selected portion within the area of said table, of a pair of normally inoperative, visual indicating lamps, switch means for controlling said lamps, and actuating means for said switch means on a plurality of said frames, said switch actuating means being operable, when the support frame and carriage frame are in a predetermined aligned position, to energize at least one of said indicator lamps and to energize the other lamp when said support and carriage frames are displaced from said aligned position a predetermined distance in a predetermined direction of displacement.

14. Indexing means for radiographic equipment comprising the combination with an elongated support frame forming a table, a film carriage frame longitudinally movable with respect to said support frame beneath and substantially throughout the length of said table, a support frame for a ray source and means to mount said support means for longitudinal as well as lateral movement with respect to said table to position said ray source vertically above substantially any selected portion within the area of said table, of a plurality of normally inoperative indicator lamps, at least one of which comprises an offset indicator lamp and others of which comprise alignment indicators, switch means controlling the operation of said lamps, and switch actuating means on a plurality of said frames and operable to energize one of said lamps when the support and carriage frames are in a predetermined relative position of alignment longitudinally of the support frame, and to energize another of said lamps when said support and carriage frames are in a predetermined relative position of alignment laterally of said support frame, said actuating means being operable also to energize the offset indicator lamp when said support and carriage frames are displaced from aligned position a predetermined distance in a predetermined direction.

15. Indexing means for radiographic equipment, comprising the combination with an elongated support frame and a plurality of relatively movable frames, including a film carriage frame movable longitudinally with respect to the support frame and a mounting frame for a source of X-rays movable longitudinally and laterally with respect to the support frame independently of the movement of said film carriage frame to position said source of X-rays vertically above any selected portion within the area of a film on the film carriage frame, of a pair of normally inoperative visual indicating lamps, switch means for controlling said lamps and actuating means for said switch means upon a plurality of said frames, said switch actuating means being operable, when the support frame and said carriage frame are in a predetermined aligned position, to energize at least one of said indicator lamps and to energize the other lamp when said support and carriage frames are displaced from said aligned position through a predetermined distance in a predetermined direction of displacement, the switch actuating means being arranged to permit actuation of one indicator lamp only when the other is inactive and vice versa.

JULIUS J. GROBE.